United States Patent [19]

Smith

[11] Patent Number: 5,586,317
[45] Date of Patent: Dec. 17, 1996

[54] METHOD AND APPARATUS FOR IMPLEMENTING I/O IN A FRAME-BASED COMPUTER SYSTEM

[75] Inventor: Walter R. Smith, Palo Alto, Calif.

[73] Assignee: Apple Computer, Inc., Cupertino, Calif.

[21] Appl. No.: 99,860

[22] Filed: Jul. 30, 1993

[51] Int. Cl.⁶ ................................. G06F 9/40
[52] U.S. Cl. .................. 395/683; 395/133; 395/103; 395/821
[58] Field of Search ................... 395/275, 148, 395/155, 161, 650, 821, 133, 103, 148, 155, 161, 618

[56] References Cited

U.S. PATENT DOCUMENTS

| | | | |
|---|---|---|---|
| 4,864,497 | 9/1989 | Lowry et al. | 364/300 |
| 5,148,522 | 9/1992 | Okazaki | 395/161 |
| 5,220,649 | 6/1993 | Forcier | 395/148 |
| 5,237,651 | 8/1993 | Randall | 395/148 |
| 5,247,677 | 9/1993 | Welland et al. | 395/650 |
| 5,265,206 | 11/1993 | Shackelford et al. | 395/200 |
| 5,307,451 | 4/1994 | Clark | 395/127 |
| 5,307,490 | 4/1994 | Davidson et al. | 395/650 |
| 5,309,555 | 5/1994 | Akins et al. | 395/157 |
| 5,317,688 | 5/1994 | Watson et al. | 395/161 |
| 5,327,529 | 7/1994 | Fults et al. | 395/155 |
| 5,327,562 | 7/1994 | Adcock | 395/700 |
| 5,331,555 | 7/1994 | Hashimoto et al. | 395/419.07 |
| 5,390,281 | 2/1995 | Luciw et al. | 395/12 |
| 5,398,310 | 3/1995 | Tchao et al. | 395/144 |
| 5,404,528 | 4/1995 | Mahajan | 395/650 |
| 5,410,705 | 4/1995 | Jones et al. | 395/700 |
| 5,414,843 | 5/1995 | Nakamura et al. | 395/600 |
| 5,432,525 | 7/1990 | Maruo et al. | 345/2 |
| 5,434,777 | 7/1995 | Luciw | 364/419.13 |
| 5,442,793 | 8/1995 | Christian et al. | 395/700 |
| 5,446,882 | 8/1995 | Capps et al. | 395/600 |
| 5,448,735 | 9/1995 | Anderson et al. | 395/650 |
| 5,457,476 | 10/1995 | Jenson | 345/146 |
| 5,463,696 | 10/1995 | Beernink et al. | 382/186 |
| 5,477,447 | 12/1995 | Luciw et al. | 364/419.08 |
| 5,491,495 | 2/1996 | Ward et al. | 345/173 |

OTHER PUBLICATIONS

O'Connor, Rory J., "Apple Banking on Newton's Brain", Apr. 22, 1992, San Jose Mercury News.

Weiman, Liza and Moran, Tom, "A Step Toward the Future", Aug. 1992, Macworld Magazine.

Soviero, Marcelle M., "Your World According to Newton", Sep. 1992, Popular Science Magazine.

Abatemarco, Fred, "From the Editor", Sep. 1992, Popular Science Magazine.

*Primary Examiner*—Christopher B. Shin
*Attorney, Agent, or Firm*—Hickman Beyer & Weaver

[57] ABSTRACT

A method for implementing I/O in a frame-based computer system, including the steps of: a) determining whether there is a communication pertaining to a frame-based computer system; b) determining which frame the communication is associated with, if any; and c) causing the frame to implement a script, including sequence of computer-implemented process steps which causes with input to or output from the frame-based computer system. The frame-based computer system includes a CPU, a memory system coupled to the CPU, an input system coupled to the CPU, and an output system coupled to the CPU. A frame system stored in the memory system and implemented on the CPU provides a basic data structure for the frame-based computer system. A mechanism for detecting an output request initiated within the frame-based computer system causes an associated frame to execute a sequence of computer-implemented process steps to cause the output system to make an output. A mechanism for detecting an input from the input system causes an associated frame of the frame system to implement an input script, including a sequence of computer-implemented process steps, which causes an input into the frame system.

11 Claims, 14 Drawing Sheets

METHOD AND APPARATUS FOR IMPLEMENTING I/O IN A FRAME-BASED COMPUTER SYSTEM

BACKGROUND OF THE INVENTION

The present invention relates generally to computer systems, and more particularly to methods for making inputs and outputs to computer systems based upon semantic networks and frame systems.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. As such, the pen-based computer system can become a "personal digital assistant" (PDA) which can undertake a variety of scheduling, note taking, and organizational tasks.

Some large, e.g. minicomputer size, computer systems manage their data operations as "frame" objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985. Frame systems are advantageous in that they permit "knowledge bases" to be efficiently implemented to perform a number of artificial intelligence (AI) tasks. Frame systems are uncommon on personal computer (PC) systems, and were heretofore unknown on hand-held pen-based or PDA systems. Furthermore, the integration of a frame system with input/output (I/O) systems of a computer system was heretofore unknown. For example, it was not previously known that a frame system could be integrated with a view system and a communications (COMM) system in a pen-based or PDA system.

SUMMARY OF THE INVENTION

The present invention implements a scripting system and one or more I/O systems in a frame-based computer system. The integration of a frame system, a scripting system, and one or more I/O systems, permits highly efficient I/O, data storage, and data retrieval in a pen-based or PDA computer system.

A method for implementing I/O in a frame-based computer system in accordance with the present invention comprises the steps of: a) determining whether there is a communication pertaining to a frame-based computer system; b) determining which frame the communication is associated with, if any; and c) causing the frame with which the communication is associated to implement a script comprising a sequence of computer-implemented process steps which causes either input to or output from the frame-based computer system. When the frame-based computer system is making an output, the method includes the steps of: a) detecting an output request; b) determining which frame, which any, of a frame-based computer system is associated with the output request; and c) causing the system to implement a script comprising a sequence of computer-implemented process steps which causes an output portion of the computer system to provide an output. When processing an input to the system, the method includes the steps of: a) detecting an input; b) determining which frame, if any, of a frame-based computer system is associated with the input; and c) causing the frame to implement a script comprising a sequence of computer-implemented process steps which causes an input portion of the computer system to provide an input.

A frame-based computer system, in accordance with the present invention, includes a CPU, a memory system, and an I/O system. The memory system and the I/O system are coupled to the CPU. The frame-based computer system also includes a frame system stored within the memory system and implemented on the CPU for providing a basic data structure for the computer system. The frame-based computer system also includes a mechanism for detecting an output requested within the frame-based computer system and for causing a frame of the frame system to implement an output script comprising a sequence of computer-implemented process steps which causes the output mechanism to make an output. The frame-based computer system also includes a mechanism for detecting an input from the input system and for causing a frame of the frame system to implement an input script, including a sequence of computer-implemented process steps, which causes an input into the frame system.

An advantage of the present invention is that a scripting system, an object system, and one or more I/O systems, are tightly integrated and use the same unified frame-based data model, thus providing very compact and efficient frame-based I/O. For example, frames storing static information for a view system or a communication (COMM) system utilize the same frame structure, and both the view system and the COMM system would have access to the same scripting system. As such, the same frame structure which holds static data for an I/O system can also implement the execution of scripts which effectuate I/O to the computer system.

BRIEF DESCRIPTION OF THE DRAWINGS

FIG. 7b is an illustration of the process steps of FIG. 7a;

FIG. 9b illustrates a byte code table of the present invention;

FIG. 11a illustrates an example of a script language expression;

FIG. 11b illustrates a function frame made by the compiler of FIG. 10 from the expression of FIG. 11a.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
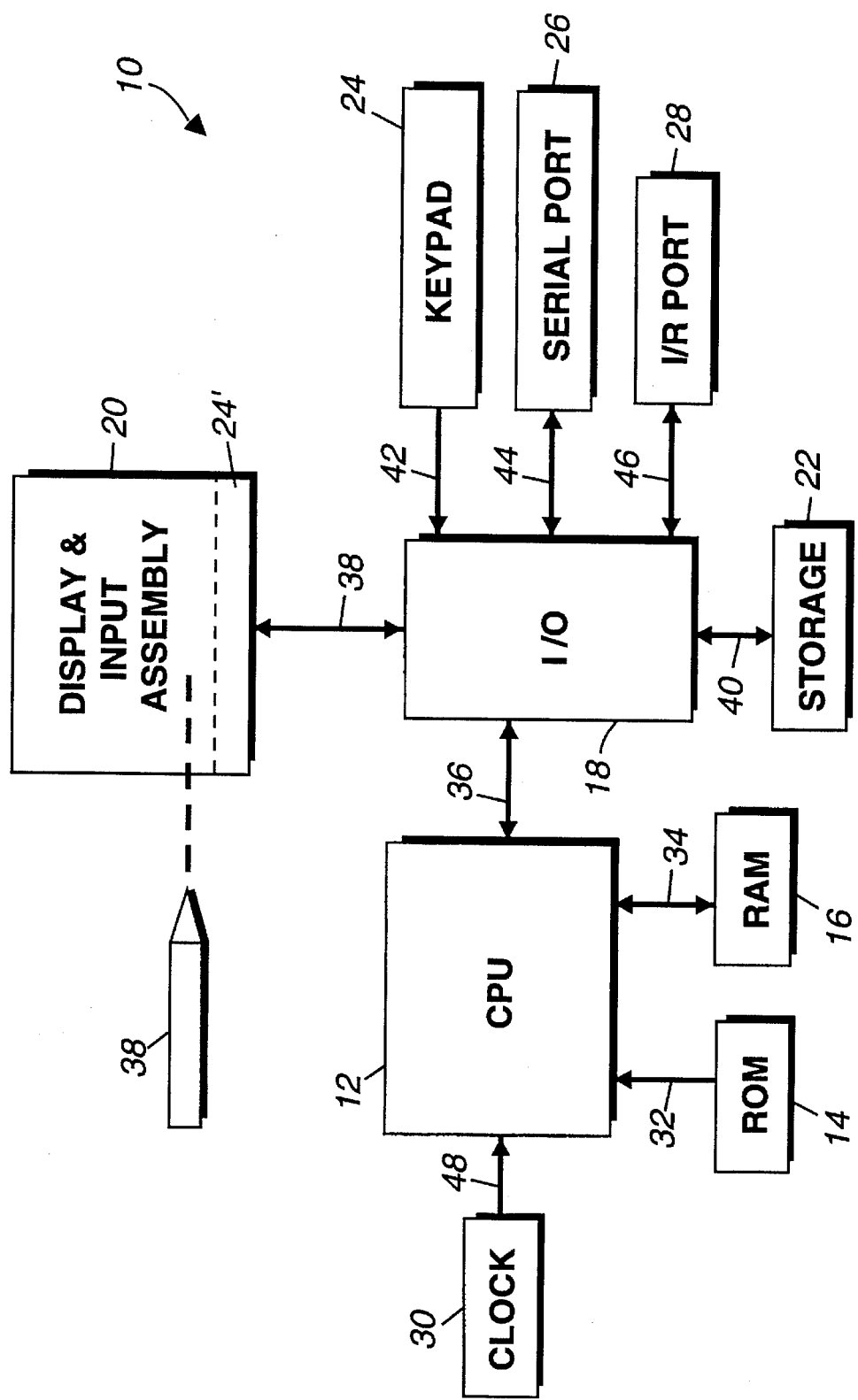
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
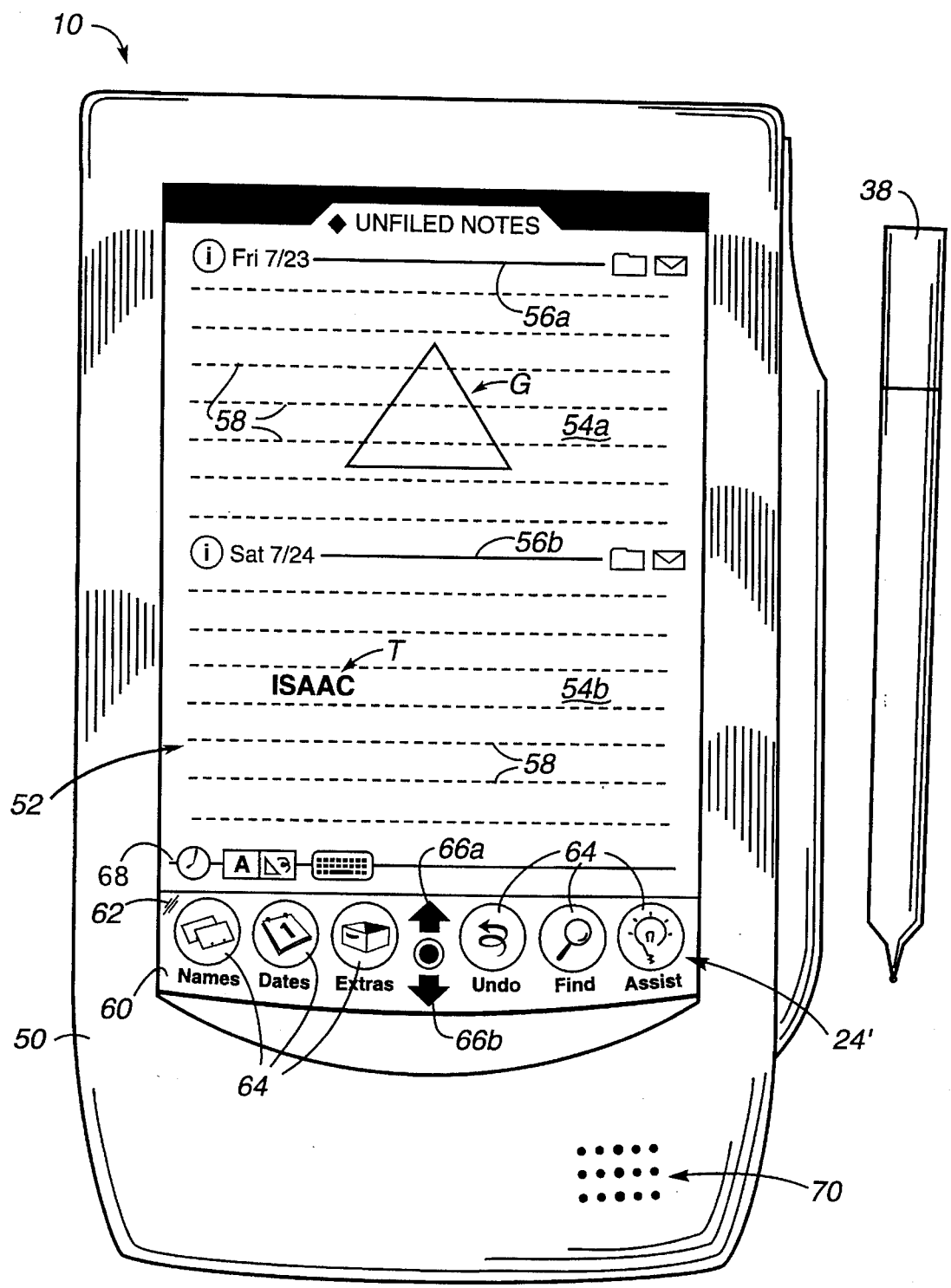
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54*a* including a header bar 56*a* and a number of guidelines 58. The header bar 56*a* preferably includes the date of creation of the note area 54*a* and a number of icons and "soft" buttons, not particularly germane to the discussion of the present invention. For this reason, the header bar 56*a* will not be discussed in detail herein. The optional guidelines 58 aid a user in entering text, graphics, and data into the pen-based computer system 10. A graphic object G in the form of a triangle is shown entered within note area 54*a*.

Additional note areas, such as a note area 54*b*, can be formed by the user by drawing a substantially horizontal line across the screen 52 with the stylus 38. The substantially horizontal line is recognized by the system 10 and is converted into a second header bar 56*b*. Additional text, graphical, and other data can then be entered into this second note area 54*b*. For example, the text object T comprising "ISAAC" has been entered into second note area 54*b*.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66*a* and 66*b*. The operation of the note areas 54*a*, 54*b*, etc., scroll buttons 66*a* and 66*b*, and other aspects of computer system 10 are discussed in greater detail in copending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in the aforementioned "A Fundamental Tradeoff in Knowledge Representation and Reasoning", *Readings in Knowledge Representation*, by Brachman and Leveseque, supra. A frame-based, unified data model well adapted to support the method and apparatus of the present invention is described in co-pending U.S. patent application Ser. No. 08/099,882, filed on an even day herewith on Jul. 30, 1993 on behalf of Walter R. Smith et. al, entitled "Unified Data Structure and Method", and assigned to the assignee of the present invention, the disclosure of which is hereby incorporated herein by reference in its entirety.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, California can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference.

The object oriented programming and view system software described above makes the implementation of the processes of the present invention less cumbersome than traditional programming techniques. However, the processes of the present invention can also be implemented in alternative fashions, as will be well appreciated by those skilled in the art.

Figure 3:
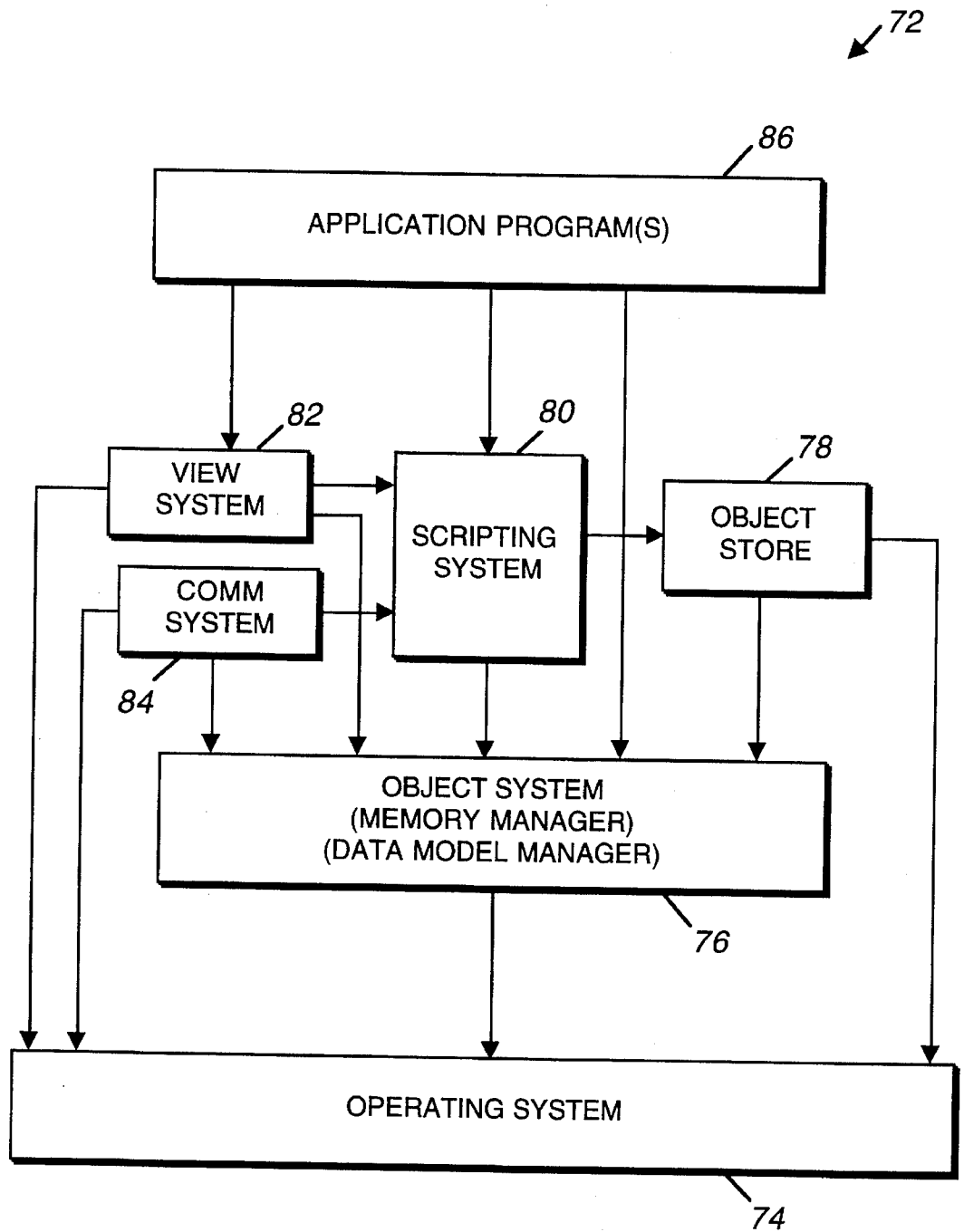
FIG. 3 is a block diagram of the operating environment for a computer system in accordance with the present invention.

In FIG. 3, an operating environment 72 is supported as a computer-implemented process on the computer system 10 illustrated in FIG. 1. At a base layer, an operating system 74 provides basic operating services such as input/output (I/O), and managing physical resources such as RAM 16, storage 22, etc. One level above the operating system 74 is an object system 76, including a memory manager and a data model manager. The next level includes an object store 78, a scripting system 80, a view system 82, and a COMM system 84. The object store 78 and the systems 80–84 are, individually, well known to those skilled in the art. The object store 78 is connected to the object system 76, the operating system 74, and the scripting system 80. The object store translates object system objects into a form suitable for the operating system under the control of the scripting system 80.

The scripting system 80, as it will be described in greater detail subsequently, allows a user or system developer to generate "scripts" which include a series of computer-implemented processes. A scripting system 80 is supported by the object system 76 and can use the object store 78. Scripting system 80 is preferably a frame-based scripting system such as the scripting system "Self" produced by researchers at Leland Stanford Jr. University, located in Stanford, Calif.

View system 82 is connected to the operating system 74, the object system 76, and the scripting system 80. View systems, such as view system 82, are well known to those skilled in the art. For example, the PenPoint operating system from Go, Inc., of Foster City, Calif., is a well known pen-based operating system having a view system.

COMM system 84 is an example of an additional I/O system and is connected to the operating system 74, the object system 76, and the scripting system 80. The COMM system 84, therefore, has access to the same scripting language utilized by the view system 82 and to the same data structure provided by object system 76. This commonalty between the various I/O systems (such as view system 82 and COMM system 84) permits a compact and efficient utilization of memory and other system resources, and the efficient use of a common scripting language.

Application programs, such as application programs 86, are supported by the object system 76, the scripting system 80, the view system 82, and other I/O systems, such as the COMM system 84. These application programs, such as the aforementioned "notepad" program, therefore have access to a number of high-level and mid-level resources. For example, an application program 86 can utilize the view system to create images on viewing screen 52, or to detect a "click" or "tap" on the screen 52. Application program 86 can also reach into the scripting system 80 and directly into, for example, frame objects of the object system 76.

Figure 4A:
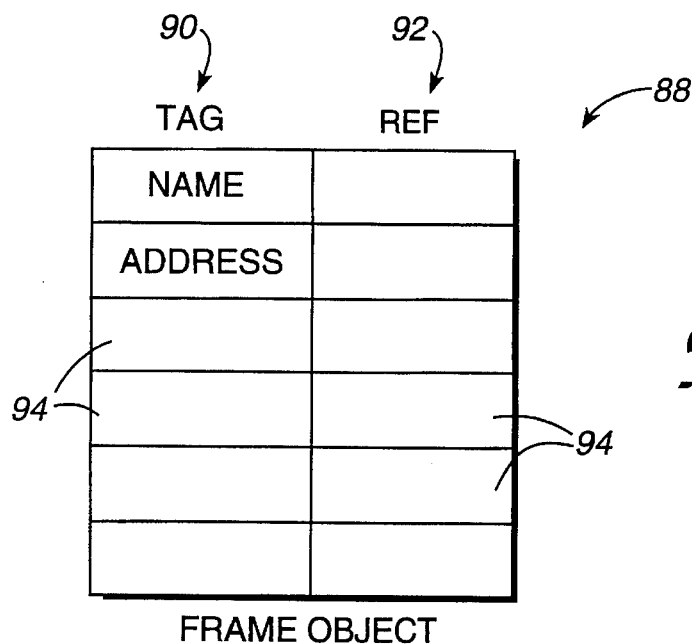
FIGS. 4a, 4b, and 4c illustrate three data types used in the present invention.
Figure 4B:
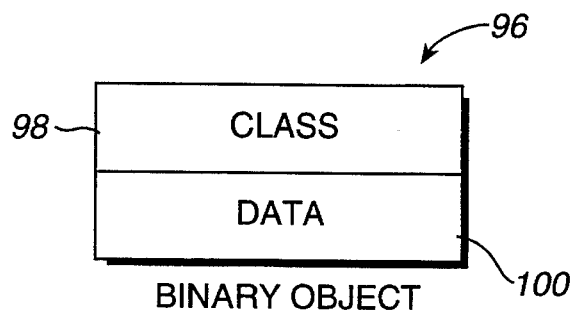
Figure 4C:
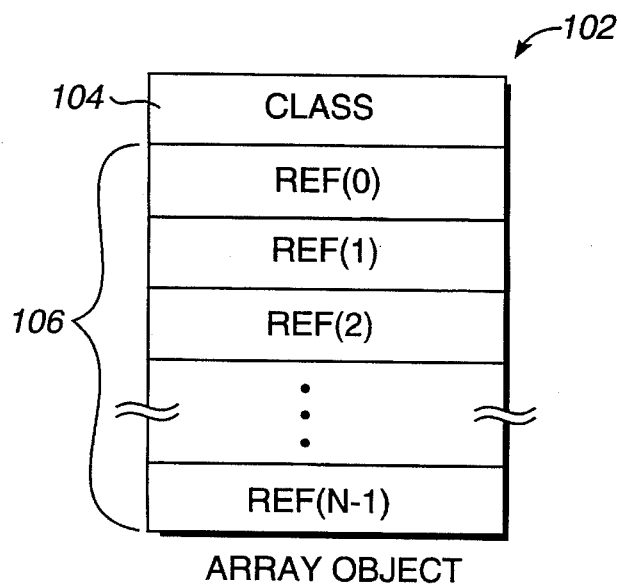

FIGS. 4a–4c illustrate three "primitive" data object types supported by the object system 76 of the present invention. In FIG. 4a, a frame object 88 is illustrated in a two-column table format including a "tag" column 90 and a reference (Ref) column 92. The individual storage locations (both tag and Ref) within columns 98 and 92 comprise slots such as slots 94. A Ref is a value that is either an "immediate" (i.e. an instruction or data which can be immediately acted upon) or a pointer to another object in the data structure.

A second type of "primitive" data object is the binary object 96. A binary object includes a class slot 98 and a data section 100. The class slot 98 indicates the class of the binary object 96. The data section 100 includes a collection of binary bits with no specific meaning to the binary object 96. The bits within the data slot 100 are simply carried by the binary object 96 for use in interpretation elsewhere within the system.

A third form of "primitive" data object is illustrated in FIG. 4c. This form of data object is known as an array object 102. An array object 102 includes a class slot 104 and a series of reference or Ref slots 106. If there are N Ref slots 106, they can be referred to as Ref(0), Ref(1) . . . Ref(N–1).

Figure 5:
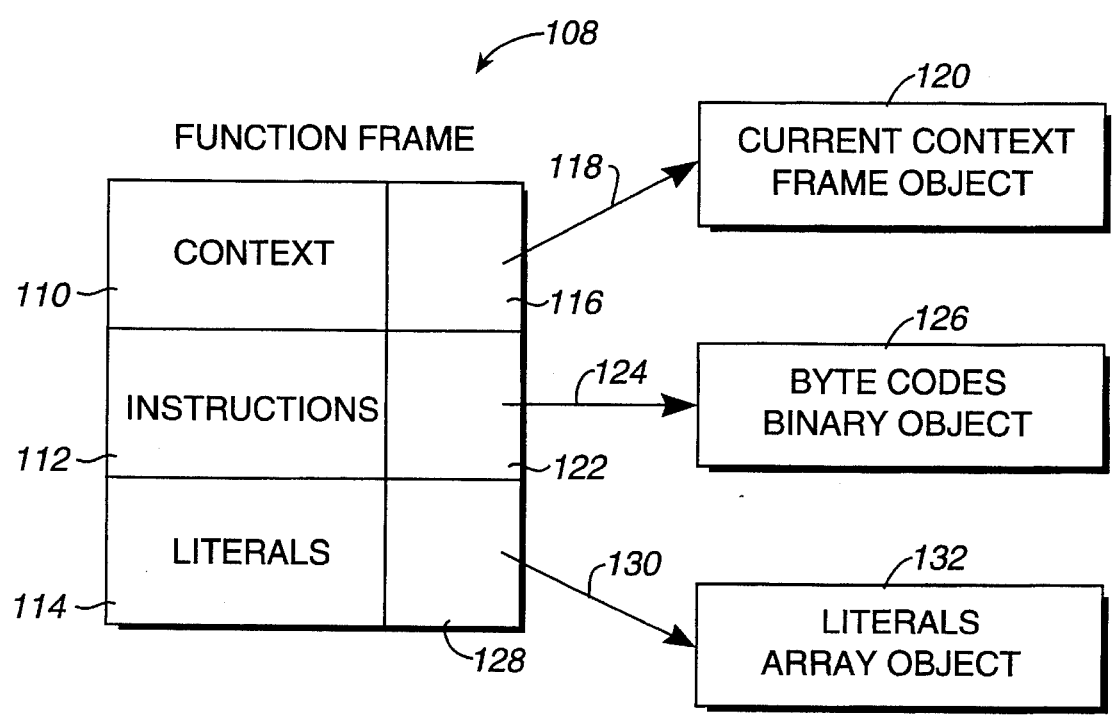
FIG. 5 illustrates a function frame of the present invention.

In FIG. 5, a function frame 108 is a special form of the frame object shown in FIG. 4a. The function frame 108 has three tags, including a context slot 110, an instruction slot 112, and a literal slot 114. A first Ref 116, associated with the context slot 110, contains a pointer 118 which points to the current context frame object 120. A Ref 122, associated with instructions slot 112, has a pointer 124 which points to a byte codes binary object 126. Finally, a Ref 128, associated with literals slot 114, has a pointer 130 which points to a literals array object 132. The use and operation of the function frame 108 will be discussed in greater detail subsequently.

Figure 6:
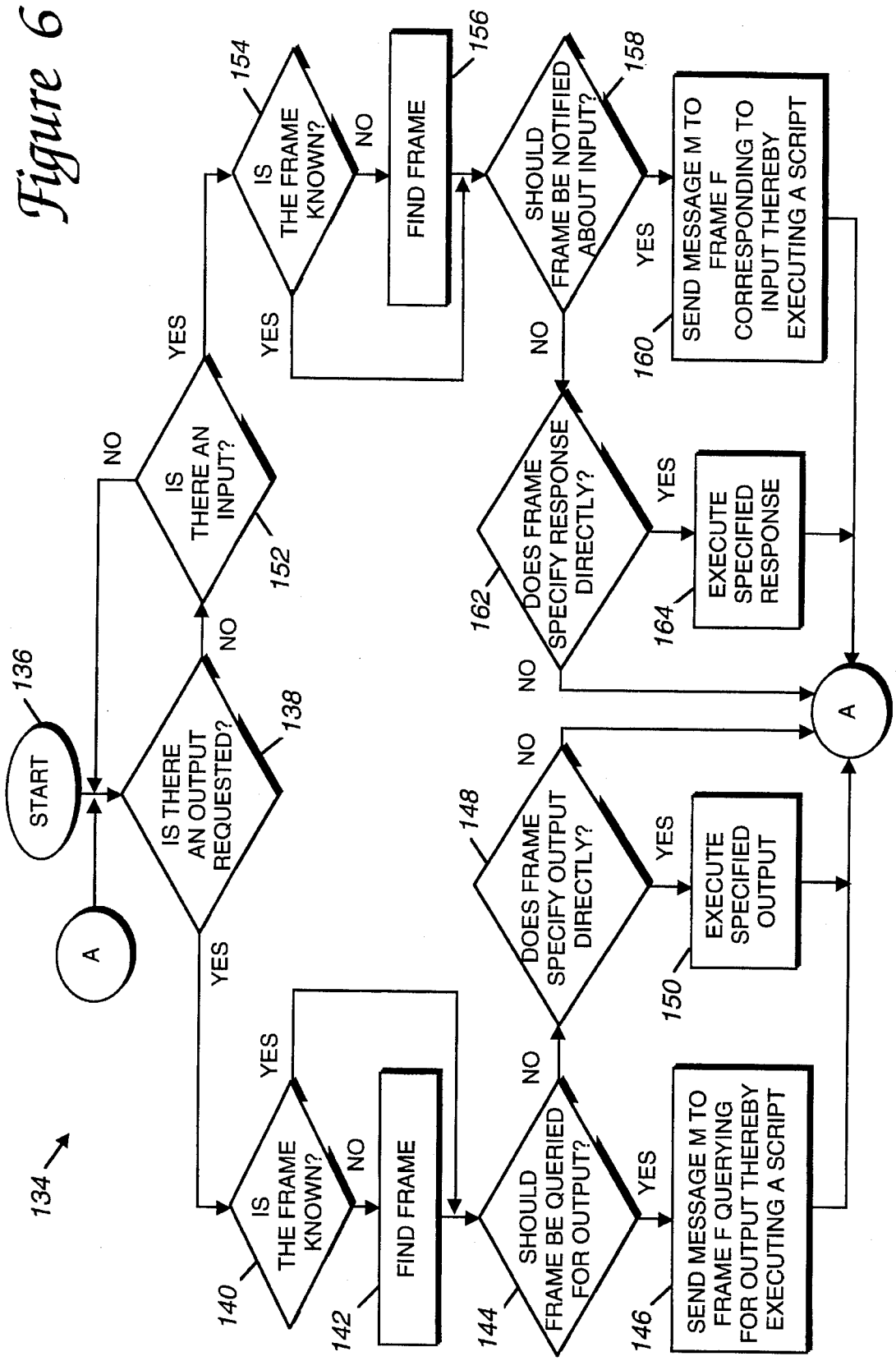
FIG. 6 illustrates the process steps of the present invention for implementing I/O in a frame-based computer system.

In FIG. 6, a computer-implemented process 134 for implementing I/O in a frame-based computer system is illustrated in a flow diagram format. The process 134 begins at 136 and, in a decision step 138, it is determined whether there is an output requested. This output can be requested by an application program 86 (FIG. 3) or can be generated elsewhere within the operating environment 72. If there is an output requested, a decision step 140 determines whether the frame associated with the output request is known. If not, a step 142 finds the frame. The implementation of steps 140 and 142 are well known to those skilled in the art. If step 140 determines that the frame associated with the output is known, or after the frame is found by step 142, a decision step 144 asks whether the frame should be queried for output. This is determined by examining the slots of the frame for an indication that it should be queried. If it is determined by step 144 that the frame should be queried for output, a step 146 sends a message M to frame F querying for the output and thereby executing a script which is implemented by the scripting system 80 (FIG. 3). Process control then returns to point A on FIG. 6, i.e., process control returns to step 138.

If step 144 determines that the frame should not be queried for output because its slots do not contain such an indication, a decision step 148 determines whether the frame specifies its output directly. If step 148 does determine that the frame specifies the output directly in its slots, the specified output is executed in a step 150 and process control is again returned to point A on FIG. 6. If the result of the decision step 148 is in the negative, process control is returned directly to point A of FIG. 6.

If decision step 148 determines there is not an output requested, a decision step 152 determines whether there is an input. If not, process control returns to step 138. If the result of the decision step 152 is in the affirmative, a step 154 determines whether the frame associated with the input is known. If it is not, a step 156 will find the frame associated with the input based upon its slots. Again, finding a frame object upon its slots, is a technique well known to those skilled in the art. If step 154 determines that the frame is known, or after the find-frame step 156 has been completed, a step 158 determines whether the frame should be notified about the input. Whether or not the frame should be notified about an input is usually dependent upon the contents of its slots.

If it is determined in step 158 that the frame should be notified about the input, a step 160 sends a message M to frame F corresponding to the input, thereby executing a script in the scripting system 80. Process control is then returned to point A of FIG. 6. If decision step 158 determines that the frame should not be notified about the input, a decision step 162 determines whether the frame specifies the response of the input directly in its slots. If it does, a step 164 executes the specified response. If the decision step 162 determines that the frame does not specify the response directly in its slots, or after the execution of step 164, the process control is returned to point A of FIG. 6.

Figure 7A:
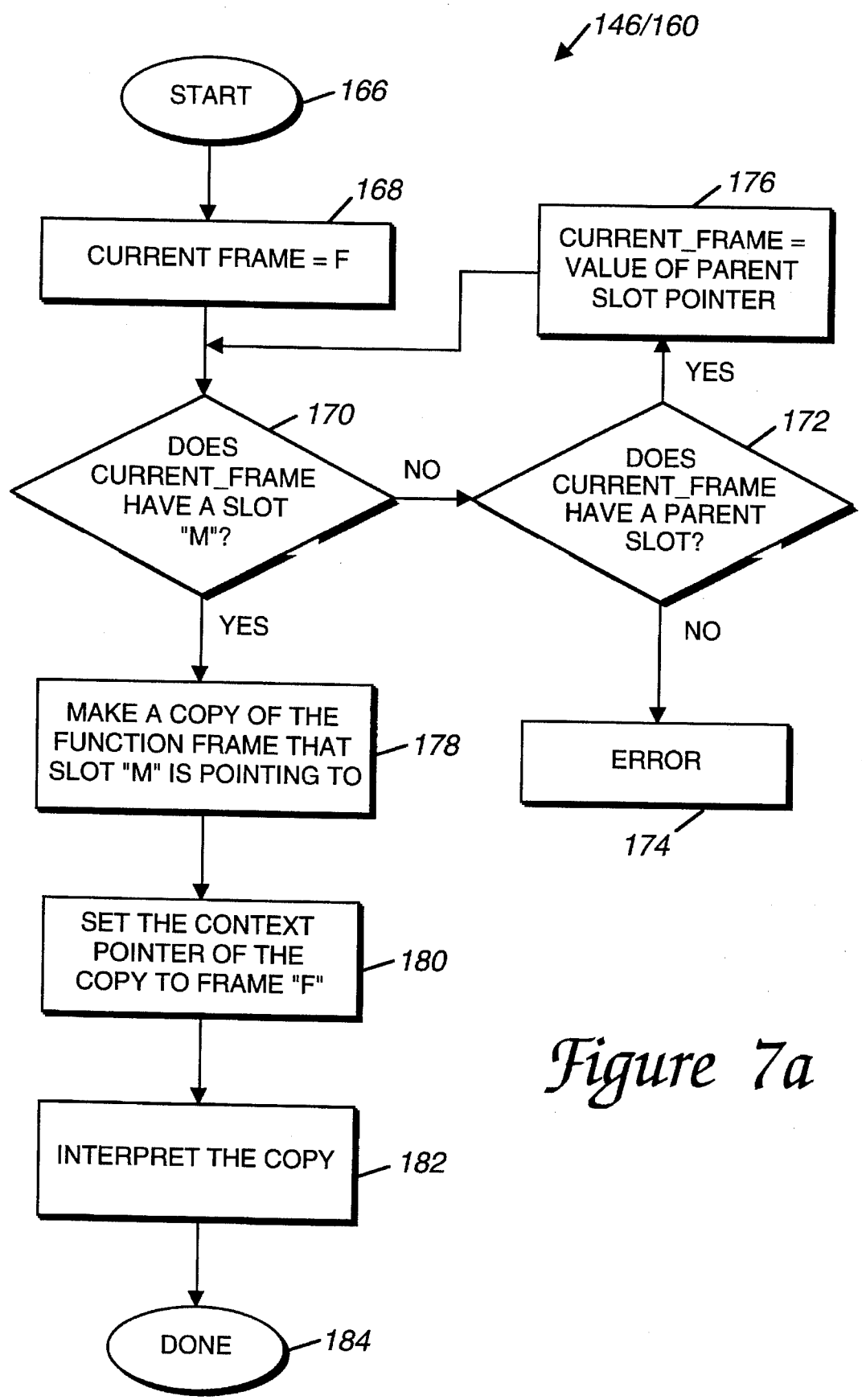
FIG. 7a illustrates the "Send a Message" steps of FIG. 6 in greater detail.

FIG. 7a illustrates steps 146/160 of FIG. 6 in greater detail. In other words, the processes of steps 146 and 160 of FIG. 6 are essentially the same, although the way the processes are handled are dependent upon the particular frame F and upon the message M. The process of steps 146 and 160 begin at 166 and, in a step 168 the current frame variable CURRENT_FRAME is assigned to the frame F designated by the step 146 or 160. Next, in a decision step 170 it is determined whether the variable CURRENT_FRAME has a tag slot "M." If it does not, a step 172 determines whether the variable CURRENT_FRAME has a parent slot. If the CURRENT_FRAME does not have a parent slot, an error is indicated in a step 174. In other words, there is an error because the message M was not found either in the CURRENT_FRAME or in any parent of the current frame. If step 172 determines that CURRENT_FRAME does have a parent slot, the step 176 sets the variable CURRENT_FRAME to the value of the parent slot pointer. Process control is then returned to step 170.

If the frame indicated by CURRENT_FRAME does have a slot "M" as indicated by step 170, a step 178 creates a copy of the function frame that the slot "M" is pointing to. Next, in a step 180, the context pointer of the copy made by step 178 is set to point to the frame "F." Finally, in a step 182, the copy made by step 178 is interpreted in terms of the context of frame "F." The process is then completed as step 184.

Figure 7B:
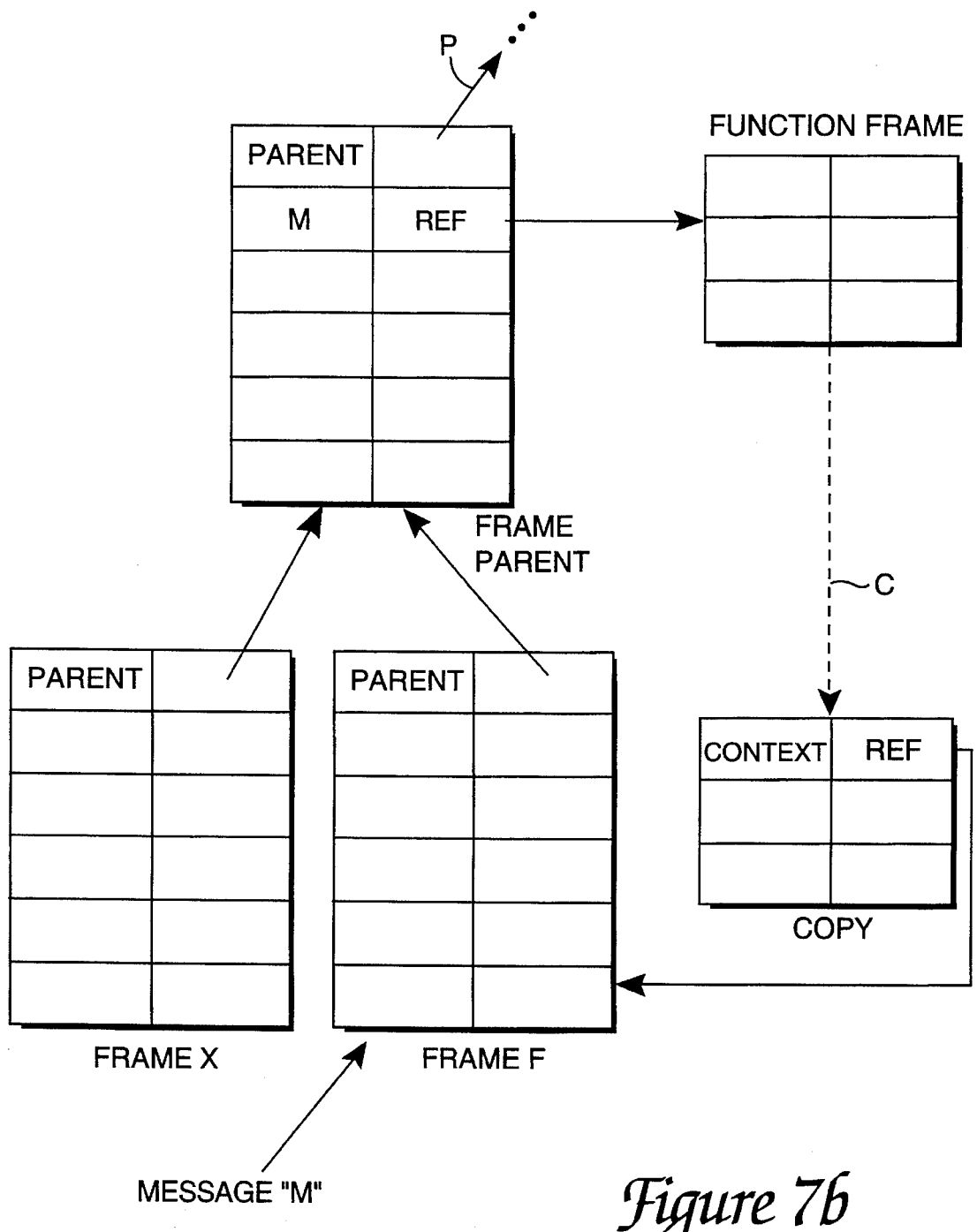

The process 146/160 of FIG. 7a is well known to those skilled in the art of programming in Self, as mentioned previously. This process is illustrated graphically in FIG. 7b. In FIG. 7b a message "M" is sent to a frame "F" where step 170 of FIG. 7a determines that the current frame does not have a tag slot "M." Frame "F" does, however, have a parent slot with a reference pointer to a parent frame. Therefore, the value of the variable CURRENT_FRAME is set to the value of the parent slot pointer in step 176. Then, step 170 determines that the frame parent does have the slot "M" in a step 170 with a Ref slot having a pointer pointing to a function frame. A copy of the function frame is made as indicated by the broken line K to make a copy, an the context pointer of the copy is directed to frame "F."

The advantage of the process of FIG. 7a, as illustrated in the structure of FIG. 7b, is that multiple frames can reference a single parent. For example, a frame X also references, as its parent, the frame parent in FIG. 7b. The frame parent can, itself, reference another parent as indicated by the pointer P. Therefore, the response to a message M can be changed for all offspring frames of a parent frame by simply changing the reference pointer for the message M or by changing the function frame to which the reference pointer points, or by changing the parent pointer of the parent. The reason why a copy is made of the function frame is because multiple frames may be accessing the same message M simultaneously and, therefore, multiple copies must be maintained.

Figure 8A:
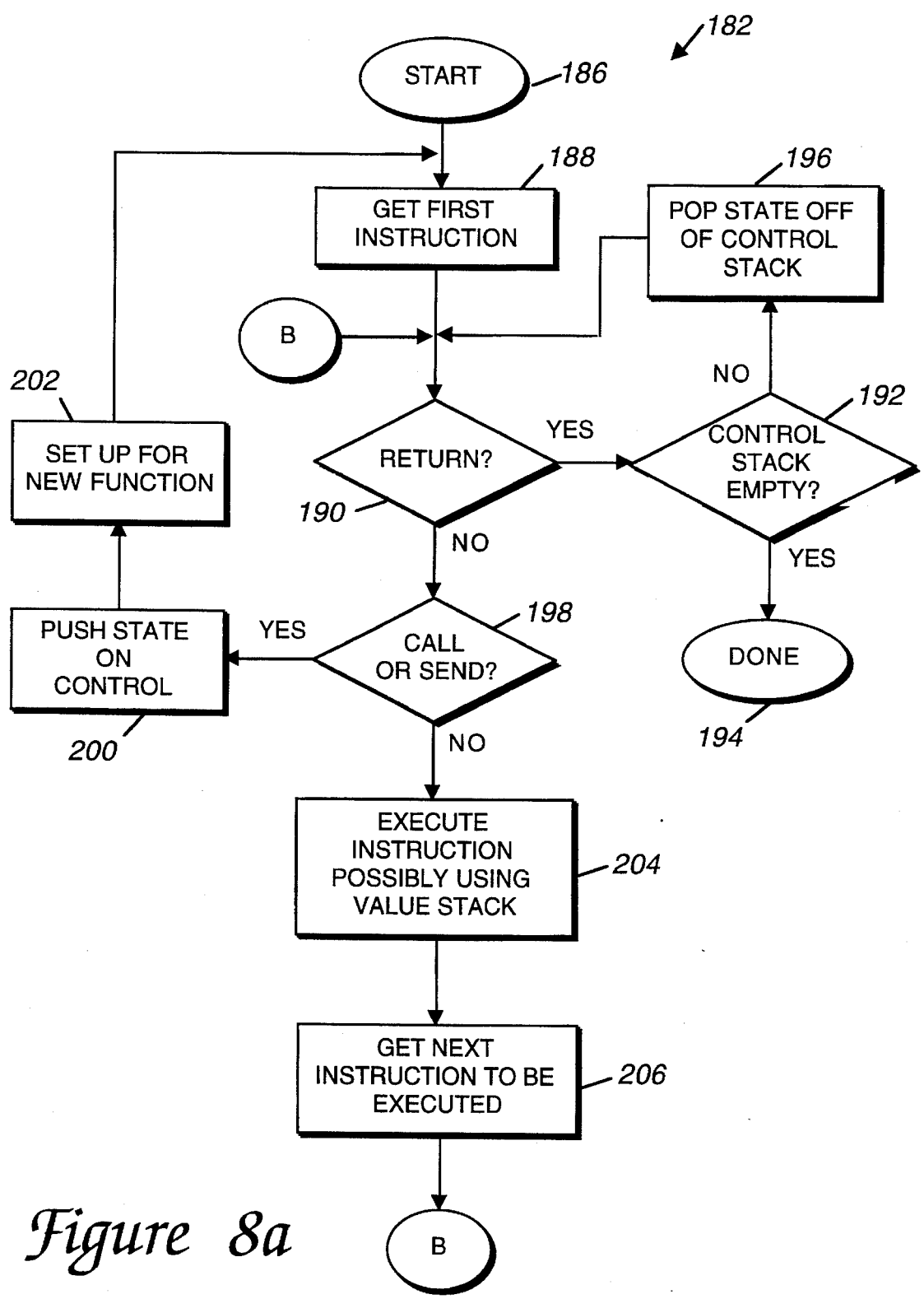
FIG. 8a is a flow diagram illustrating the "Interpret the Copy" step of FIG. 7a in greater detail.

FIG. 8a illustrates the step 182 "Interpret the Copy" of FIG. 7a in greater detail. The process 182 starts at 186 and, in a first step 188, a first instruction is obtained from the copy. Next, in a decision step 190, it is determined whether the first instruction is a RETURN instruction and, if so, a step 192 determines whether the control stack is empty. If the control stack is empty, the process 182 is completed as indicated at 194. If the control stack is not empty, as determined by step 192, the state is popped off of the control stack in a step 196 and process control is returned to step 190. If the current instruction is not a RETURN, as determined by step 190, a step 198 determines whether the instruction is a CALL or a SEND. If that instruction is either a CALL or a SEND, then a step 200 pushes the state on the control stack. Next, in a step 202, the process is set up for a new function and process control is returned to step 188. Essentially, a first loop comprising steps 190, 192 and 196, and a second loop comprising steps 198, 200, 202 allows for recursive function calls limited only by the size of the control stack.

Next, in a step 204, the instruction is executed possibly using the value stack. This instruction can be any one of a number of instructions, but obviously excludes the RETURN, CALL and SEND instructions. Next, in a step 206, the next instruction to be executed is fetched. Process control is then returned to point B of FIG. 8a to execute this new instruction. It should be noted that the process 182 of FIG. 8a is very similar in operation to a Smalltalk byte-code interpreter as described in any number of Smalltalk reference books.

Figure 8B:
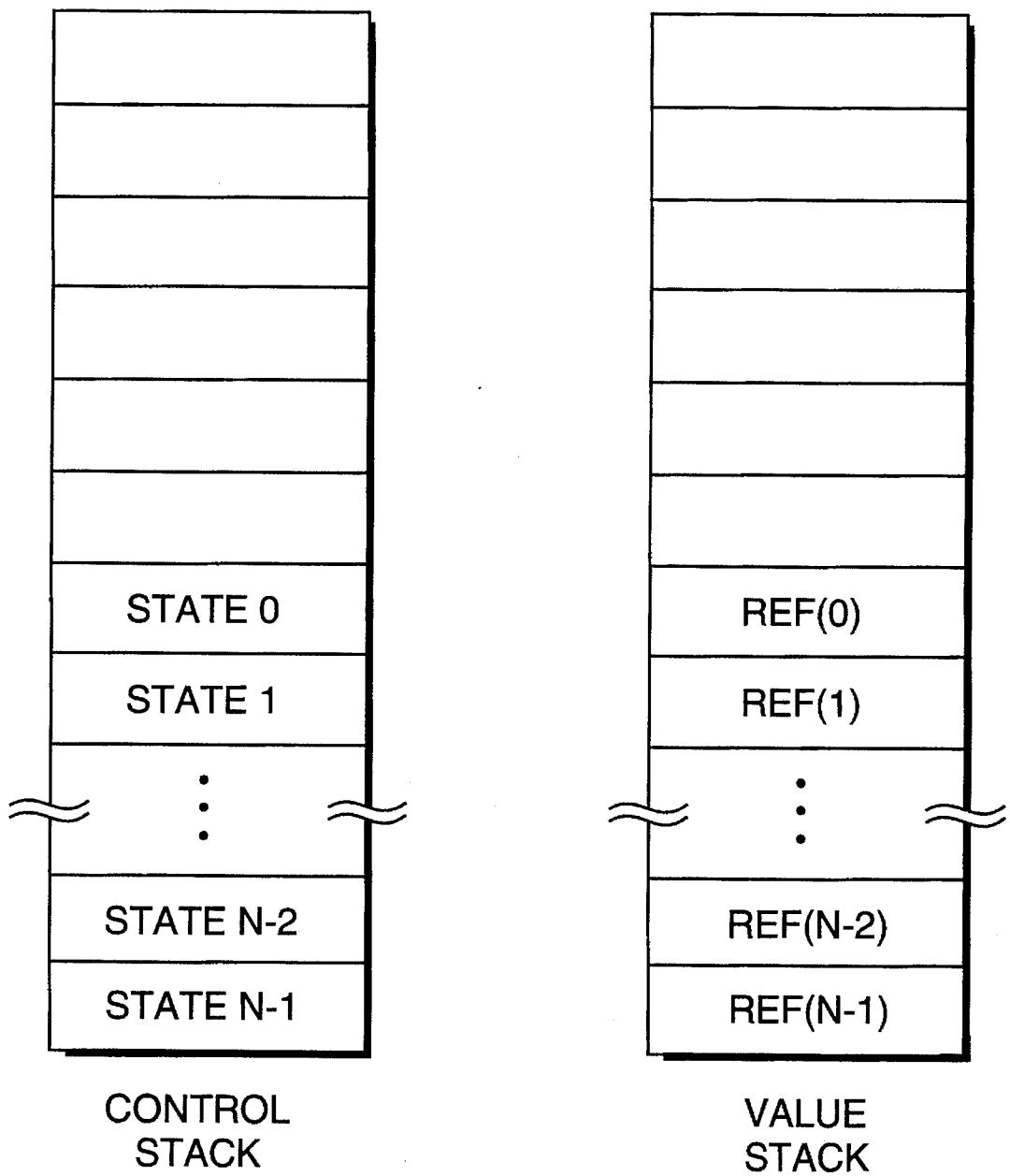
FIG. 8b illustrates the control stack and the value stack of the present invention.

FIG. 8b illustrates the control stack referred to in steps 192 and 200 of FIG. 8a, and the value stack referred to in step 204 of FIG. 8a. The control stack is essentially a stack of states ranging from a State(0) to a State(N–1), where N is the total number of states in the control stack. A state stores such information as a Ref of the current function object and the current position within the instruction sequence of that object, and is used to allow recursive calls to the process 182. The value stack is a stack of references ranging from a Ref(0) to an Ref(N–1) for N values in the stack. The value stack holds variables, constants, and operators, that are operated on by the instruction set.

Figure 9A:
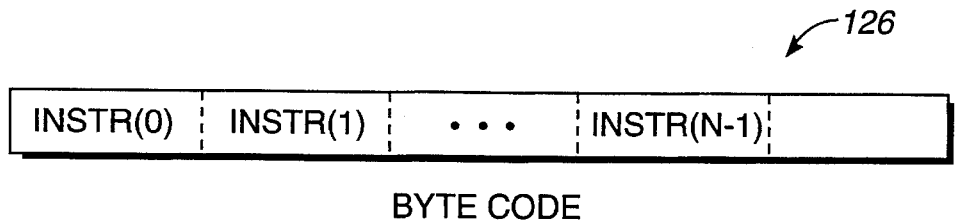
FIG. 9a illustrates a byte code of the present invention.

FIG. 9a illustrates a byte code object 126 of FIG. 5. Essentially, the byte code object 126 is a series of instructions created by the scripting system 80 and executed by the process 182.

An example of a byte-code table 208 is illustrated in FIG. 9b. These exemplary byte codes will be used in the context of an example to be discussed subsequently. In the byte-code table 208, the instruction PUSH is assigned the byte code number 0; the instruction "LOOK UP VARIABLE" is assigned the code 1; the instruction "CALL FUNCTION" is assigned the code 2; the instruction "SEND MESSAGE" is assigned the code 3; and the instruction "RETURN" is assigned the code 4, etc. There are, typically, 20–30 byte codes in a byte-code table.

Figure 10:
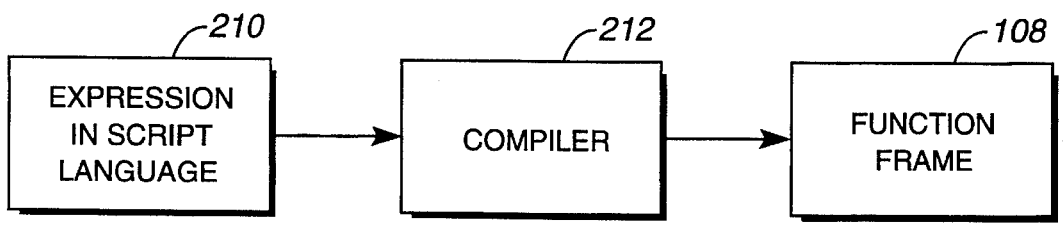
FIG. 10 illustrates the production of a function frame by compiling an expression made in a script language.

FIG. 10 illustrates the creation of a function frame 108. An expression is written in a script language as indicated by step 210 and is compiled into the function frame 108 by a compiler 212. The formation of function frames from expressions of a script language by means of a compiler is well known to those skilled in the art. Again, as an example, the Self system compiler from Stanford University can perform the function shown in FIG. 10.

Figures 11A, 11B:
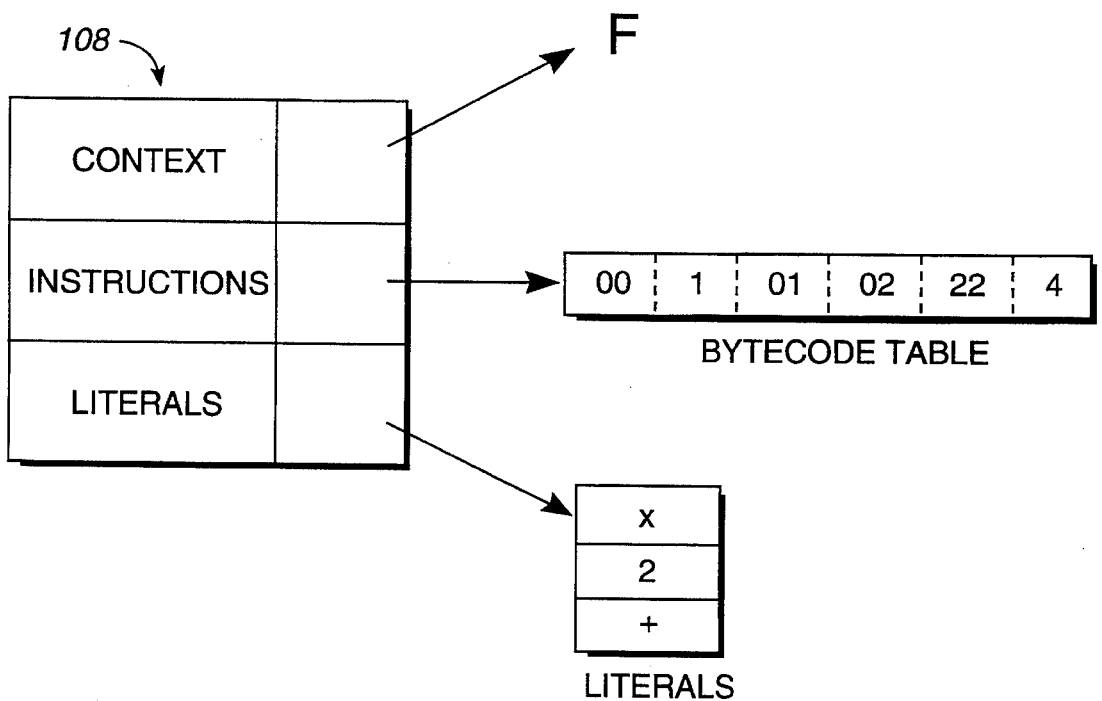

In FIG. 11a an expression in script language 210 is illustrated. In this example the simple expression "X+2" is used. Much more complex expressions are, of course, possible. The compiler 210 of FIG. 10 then creates a function frame 108 as illustrated in FIG. 11b. The function frame includes a context Ref pointer pointing to the frame F of interest, an instructions Ref pointer pointing to the byte code representing the expression 210, and a literals Ref pointer pointing to a literals table of the component elements of the expression 210.

Figure 12A:
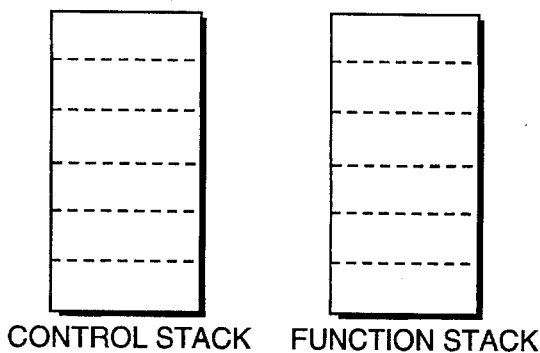
FIGS. 12a–12h illustrate the contents of the control stack and the value stack as the process of FIG. 8a is implemented.
Figure 12B:
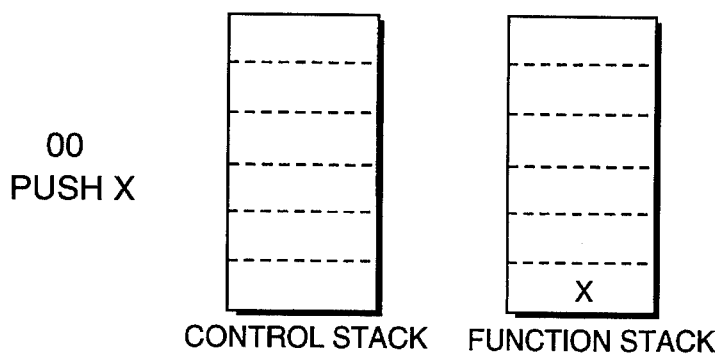
Figure 12C:
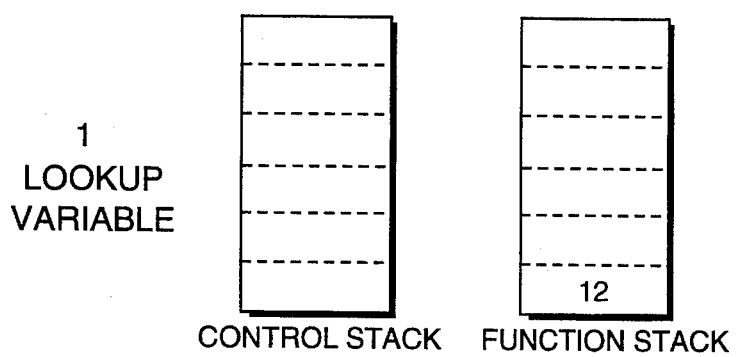
Figure 12D:
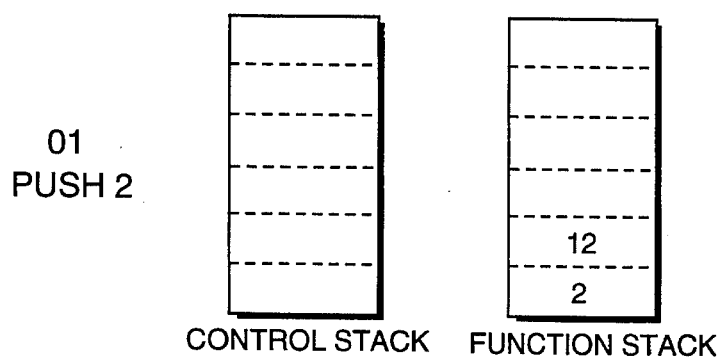
Figure 12E:
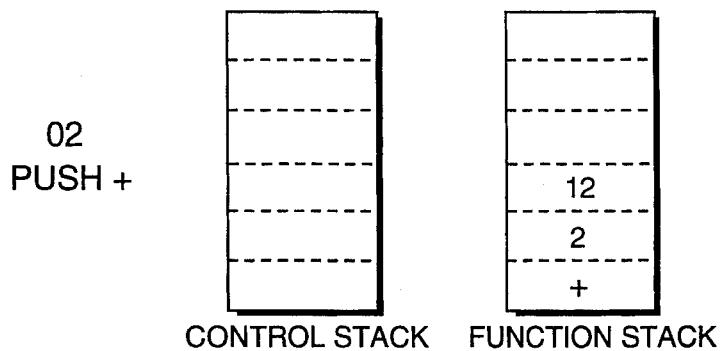
Figure 12F:
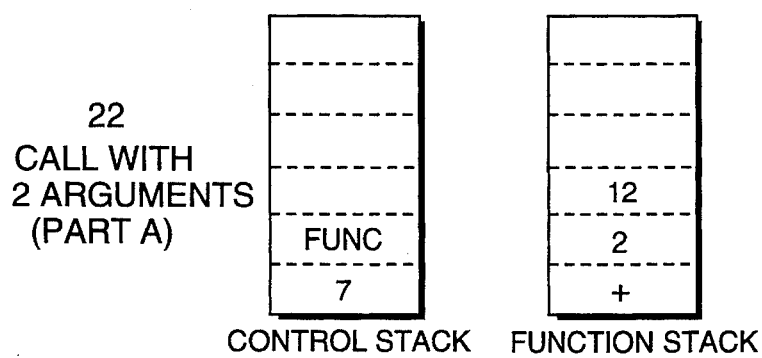
Figure 12G:
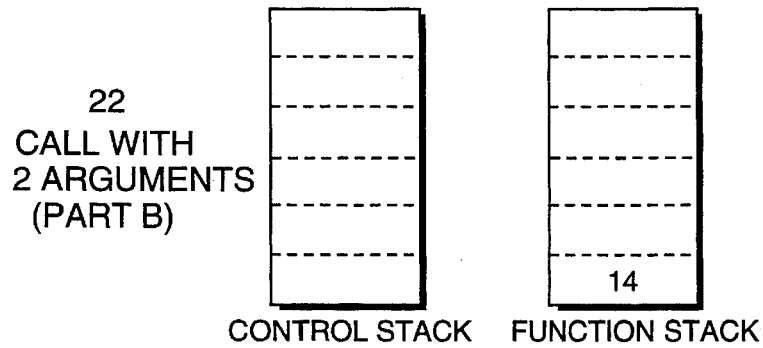
Figure 12H:
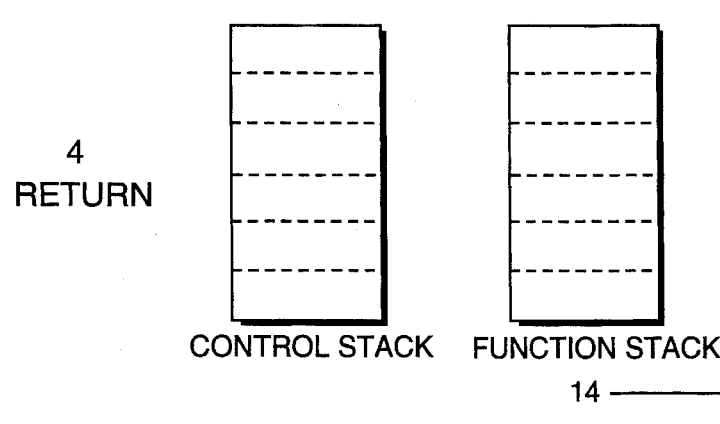

The "INTERPRET THE COPY" step 182 will be further illustrated in terms of an example with reference to FIGS. 11a–11e and 12a–12h. The message M to be executed has a reference pointer which points to a function frame which adds the number 2 to the variable X. As seen in FIG. 12a, the control stack and the function stack are both clear at the beginning of the process of 182. Then, step 188 obtains the first instruction from the byte-code table of FIG. 11b, which is 00 "PUSH X." The first part of the instruction "00" refers to the byte code number (here 0 is "PUSH"), and the second part of the instruction is the index to the literals array (FIG. 11b) which here points to the first element of the literals array which is "X". The process 182 then gets the next instruction to be executed from the byte-code table of FIG. 11b, which is 1 "LOOK UP VARIABLE." The execution of this instruction in step 204 causes the variable X to be replaced by its value which, in this example, is 12. Therefore, in FIG. 12c a 12 appears in the first position of the function stack. The next instruction is then obtained in step 206 which is 01 from the byte-code table of FIG. 11b, i.e., the instruction "PUSH 2." As seen in FIG. 11d, a 2 is pushed under the function stack, moving the value 12 up one slot. Next, the instruction 02 is obtained from the byte-code table of FIG. 11b, indicating that a plus sign should be pushed onto the function stack as illustrated in FIG. 12e. The next instruction to be pulled from the byte-code table of FIG. 11b is the instruction "22," which is a call with two arguments. Since this instruction is a call, step 198 turns over process control to step 200 which pushes the state under the control stack, as indicated in FIG. 12f. This state includes the function that it was processing, and the location of the byte code being executed. In this instance, the instruction 22 is at position 7 (i.e., it is the eighth byte counting from 0) in the byte-code table 11b and a 7 is pushed onto the control stack as part of the state. The control stack and the function stack therefore would appear as in FIG. 12f after the completion of step 200. The system then sets up for a new function in a step 202, runs the entire process recursively until a RETURN instruction is encountered, and replaces the values within the function stack with the resultant 14, as illustrated in FIG. 12g. The control stack is then cleared. Finally, instruction 4 indicating "RETURN," is fetched from the byte-code table 11b, and a step 192 determines that the control stack is empty. The value 14 is then popped off the function stack to provide the result of the function and the control stacks and function stacks are cleared, as indicated in FIG. 12h.

While this invention has been described in terms of several preferred embodiments, there are alterations, permutations, and equivalents which fall within the scope of this invention. It should also be noted that there are may alternative ways of implementing the processes of the present invention. It is therefore intended that the following appended claims be interpreted as including all such alterations, permutations, and equivalents as fall within the true spirit and scope of the present invention.

What is claimed is:

1. A frame-based computer system implemented on a hand-held pen-based device, said computer system comprising:

computation means;

memory means coupled to said computation means;

input means implemented by a view system of said frame-based computer system, said input means coupled to said computation means;

output means implemented by said view system of said frame-based computer system, said output means coupled to said computation means;

a frame system stored in said memory means and implemented on said computation means for providing a data structure for said frame-based computer system, said frame system including frame objects, where each frame object is a logical software unit within said computer system having both data and processes which give said frame object attributes and capabilities, said frame system also including function frames arranged to contain a representation of an expression in a scripting language capable of implementing a computer process and arranged to be associated with a frame object, said frame system operable to implement the execution of input or output scripts contained within said function frames;

means for detecting an output request initiated by said frame-based computer system and for causing a frame object of said frame system to determine an associated output function frame in order to implement an output script comprising a sequence of computer-implemented process steps which causes said output means to make an output through said view system; and means for detecting an input initiated by an external device or user from said input means and for causing a frame object of said frame system to determine an associated input function frame in order to implement an input script comprising a sequence of computer-implemented process steps which causes an input into said frame system by way of said view system.

2. A computer-implemented method for implementing input/output in a frame-based computer system of a hand-held pen-based device, said frame-based computer system operable for determining information relating to input/output communications and to frame objects, said method comprising the steps of:

receiving an input communication through a view system of said frame-based computer system, said input communication initiated by an external device or by a user, said frame-based computer system including a plurality of frame objects each comprising a logical software unit within said frame-based computer system associated with both data and computer processes which give said frame object attributes and capabilities, said frame-based computer system also including function frames, each function frame containing a representation of an expression in a scripting language capable of implementing a computer process and arranged to be associated with a frame object, said view system using frame objects to process input/output communications;

determining whether there is a communication message pertaining to said frame-based computer system that is responsive to said input communication;

determining a first frame object said communication message is associated with, if any;

determining a first function frame associated with said first frame object that implements said communication message;

sending said communication message corresponding to said input communication to said first frame object; and causing said first frame object to implement a script contained in said first function frame so as to implement said communication message, said script comprising a sequence of computer-implemented process steps which causes either the processing of an input to or causes an output from said frame-based computer system utilizing said view system.

3. A method as recited in claim 2 wherein said step of determining whether there is a communication comprises the step of:

determining whether there is an output requested by said computer system.

4. A method as recited in claim 3 wherein said step of determining a first frame object comprises the steps of:

determining if the first frame object is known from the output requested by said computer system; and finding the first frame object if the frame frame object was not known.

5. A method as recited in claim 4 wherein said step of causing said first frame object to implement a script comprises the steps of:

determining whether said first frame object should be queried for output; and sending a message to said first frame object querying for output if said step of determining whether said first frame object should be queried is affirmative.

6. A computer-implemented method for implementing an output in a frame-based computer system of a hand-held pen-based device, said frame-based computer system operable for determining information relating to input/output communications and to frame objects, said method comprising the steps of:

detecting an output request initiated by the frame-based computer system, said frame-based computer system including a plurality of frame objects each comprising a logical software unit within said frame-based computer system associated with both data and computer processes which give said frame object attributes and capabilities, said frame-based computer system also including function frames, each function frame containing a representation of an expression, in a scripting language capable of implementing a computer process and arranged to be associated with a frame object, said view system using frame objects to process input/output communications;

determining whether there is a communication message pertaining to said frame-based computer system that is responsive to said output request:

determining which frame object, if any, of said frame-based computer system is associated with said communication message;

determining if said frame object should be caused to implement a script contained in a function frame that implements said communication message, said script comprising a sequence of computer-implemented process steps;

sending said communication message corresponding to said output request to said frame object; and causing the frame object to implement said script to cause an output portion of said computer system to provide an output through said view system, if said determination of if said frame object should be caused to implement said script is in the affirmative.

7. A method as recited in claim 6 wherein said step of determining which frame object comprises the steps of:

determining if the frame object is known from the output requested; and finding the frame object if the frame object was not known.

8. A method as recited in claim 6 further comprising the steps of:

determining whether said frame object specifies an output directly; and executing said output if said frame object does so specify.

9. A computer-implemented method for implementing an input in a frame-based computer system of a hand-held pen-based device, said frame-based computer system operable for determining information relating to input/output communications and to frame objects, said method comprising the steps of:

detecting an input communication through a view system of said frame-based computer system, said input communication initiated by an external device or by a user, said frame-based computer system including a plurality of frame objects each comprising a logical software unit within said frame-based computer system associated with both data and computer processes which give said frame object attributes and capabilities, said frame-based computer system also including function frames, each function frame containing a representation of an expression in a scripting language capable of implementing a computer process and arranged to be associated with a frame object, said view system using frame objects to process input/output communications;

determining whether there is a communication message pertaining to said frame-based computer system that is responsive to said input communication;

determining which frame object, if any, of said frame-based computer system is associated with said communication message;

determining if said frame object should be caused to implement a script contained in a function frame that implements said communication message, said script comprising a sequence of computer-implemented process steps;

sending said communication message corresponding to said input communication to said frame object; and causing said frame object to implement said script to cause an input portion of said computer system to process an input utilizing said view system if said determination of if said frame object should be caused to implement said script is in the affirmative.

10. A method as recited in claim 9 wherein said step of determining which frame object comprises the steps of:

determining if the frame object is known from the input; and finding the frame object if the frame object was not known.

11. A method as recited in claim 9 further comprising the steps of:

determining whether said frame object specifies a response directly; and executing said response if said frame object does so specify.

* * * * *